United States Patent [19]

Yu et al.

[11] 4,426,679

[45] Jan. 17, 1984

[54] COMMUNICATION MULTIPLEXER USING A RANDOM ACCESS MEMORY FOR STORING AN ACKNOWLEDGE RESPONSE TO AN INPUT/OUTPUT COMMAND FROM A CENTRAL PROCESSOR

[75] Inventors: Kin C. Yu, Burlington; Gary J. Goss, Acton, both of Mass.

[73] Assignee: Honeywell Information Systems Inc., Waltham, Mass.

[21] Appl. No.: 192,127

[22] Filed: Sep. 29, 1980

[51] Int. Cl.³ .............................................. G06F 3/00
[52] U.S. Cl. ................................................. 364/200
[58] Field of Search .............................. 364/200, 900

[56] References Cited

U.S. PATENT DOCUMENTS

| | | |
|---|---|---|
| 3,251,040 | 5/1966 | Burkholder et al. ............. 364/200 |
| 3,333,252 | 7/1967 | Shimabukro ..................... 364/200 |
| 4,056,843 | 11/1977 | Bishop et al. ................... 364/200 |
| 4,080,649 | 3/1978 | Calle et al. ...................... 364/200 |
| 4,110,830 | 8/1978 | Krygoski ......................... 364/200 |
| 4,133,030 | 1/1979 | Huettner et al. ................ 364/200 |
| 4,195,343 | 3/1980 | Joyce et al. ..................... 364/200 |
| 4,217,640 | 8/1980 | Porter et al. .................... 364/200 |
| 4,261,033 | 4/1981 | Lemay et al. ................... 364/200 |

*Primary Examiner*—Jerry Smith
*Assistant Examiner*—Michael R. Fleming

*Attorney, Agent, or Firm*—George Grayson; Nicholas Prasinos

[57] ABSTRACT

A data processing system includes a central processing subsystem, a main memory subsystem, and a number of peripheral subsystems including a communication subsystem all coupled in common to a system bus. Subsystems communicate with each other during asynchronously generated information bus transfer cycles. Each one of the subsystems receives information by providing any one of three signal responses including a positive acknowledge signal indicating an immediate response, a negative acknowledge signal indicating that the unit will most likely be busy for an extended period of time, and a quasi-negative response indicating that the unit will probably be ready during the next asynchronously generated bus transfer cycle. In order to expedite the response in the case of the transfer over the system bus of an input/output order from the central processing subsystem to the communication subsystem, apparatus in the communication system stores a positive acknowledge or a negative acknowledge signal for each communication channel. The signal is set to indicate a negative acknowledge when the previous input/output order filled the last communication control block. The signal is set to indicate a positive acknowledge when the previous input/output order emptied the communication control block.

10 Claims, 8 Drawing Figures

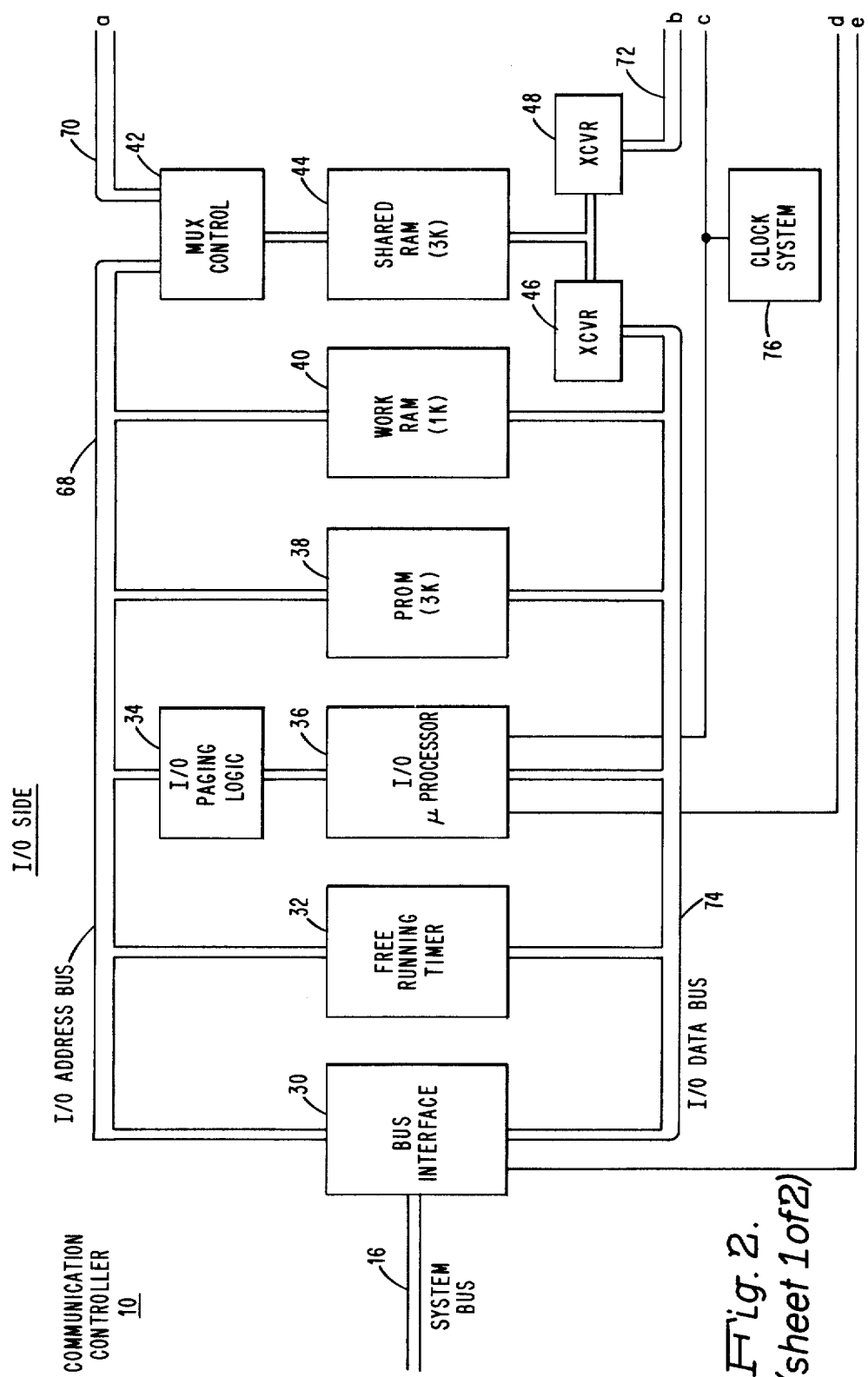
Fig. 2. (sheet 1 of 2)

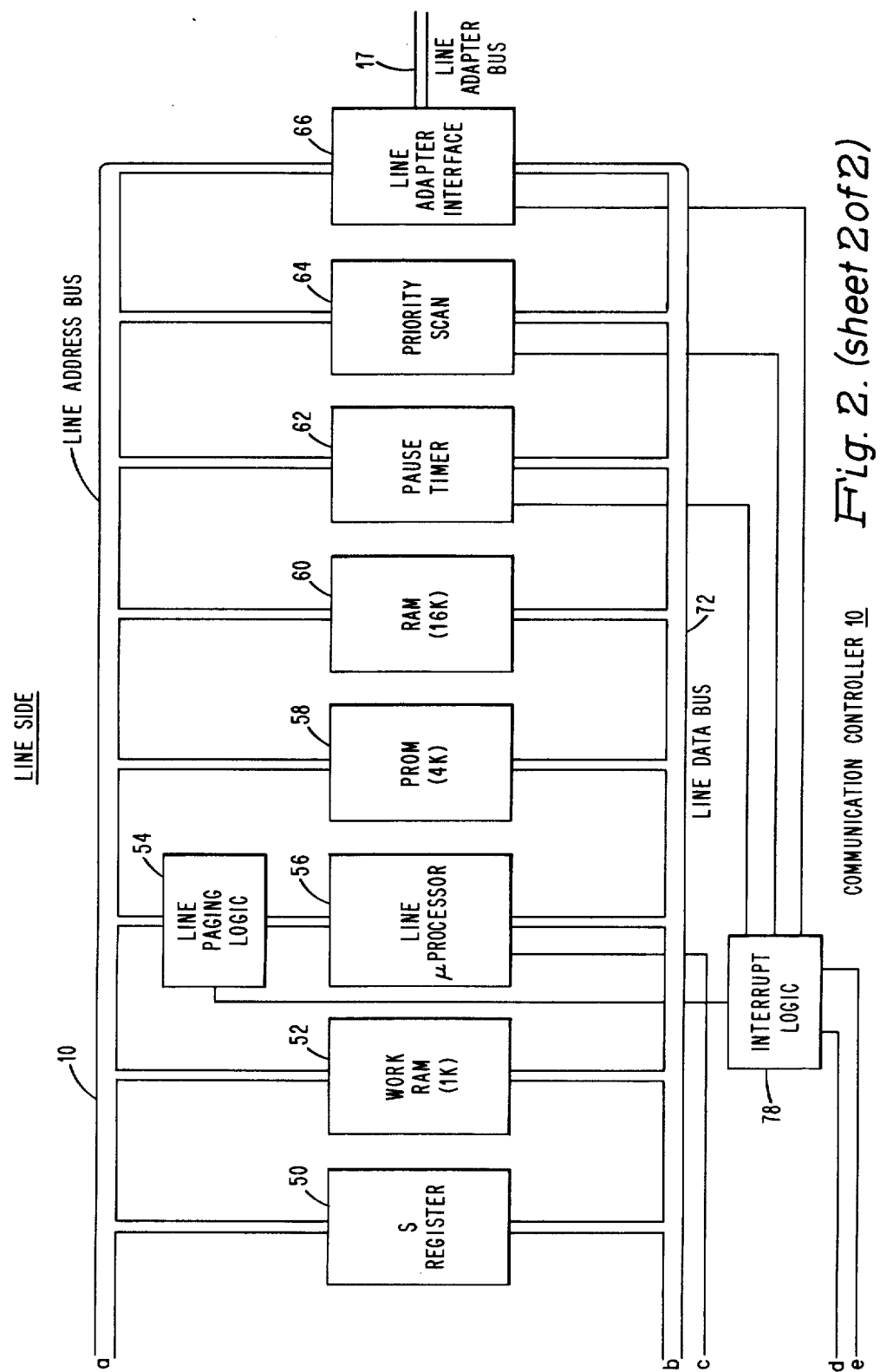
Fig. 2. (sheet 2 of 2)

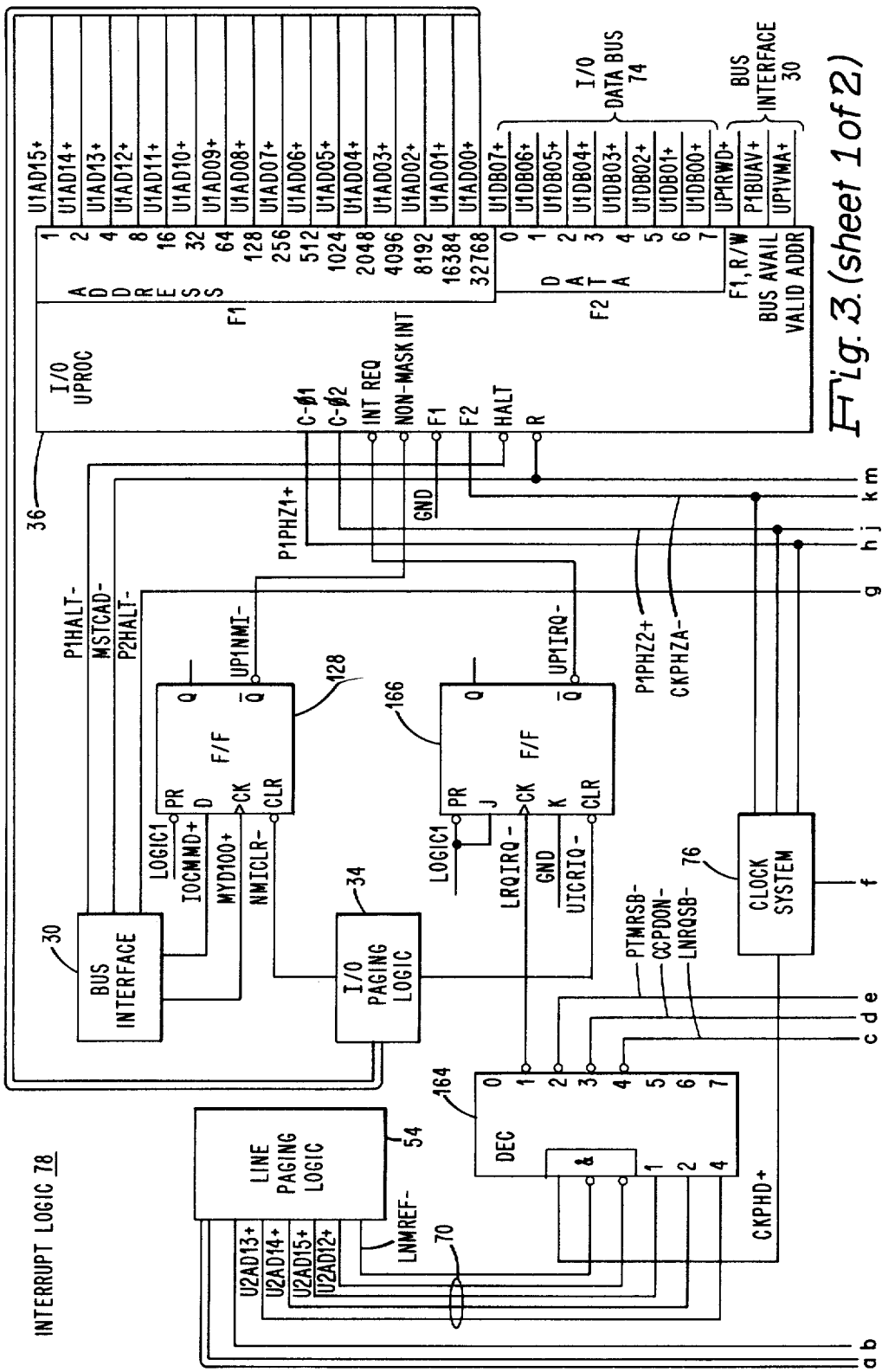
Fig. 3. (sheet 1 of 2)

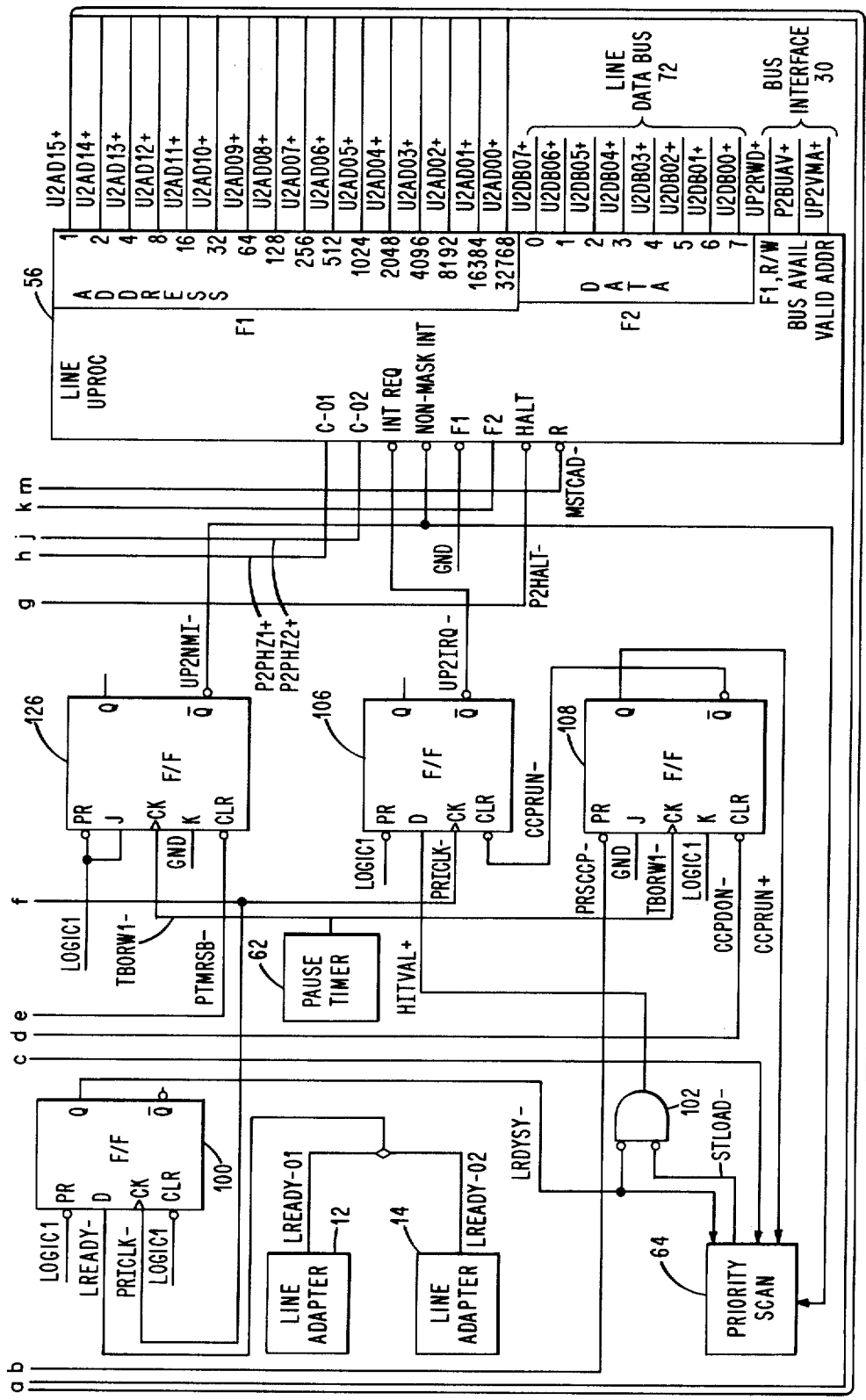
Fig. 3. (sheet 2 of 2)

INTERPROCESSOR COMMUNICATION MAILBOXES
(ADDRESS LOCATIONS IN SHARED MEMORY 44)

MAILBOX 1 BLOCK MODE COMMANDS

```
                      BIT POSITION
         WORD   0   1   2   3   4   5   6   7
            0 | F | R | - | L | L | L | L | D |
            1 | SHARED MEMORY 44, WORK RAM 52, RAM 60 (MSB) |
            2 | SHARED MEMORY 44, WORK RAM 52, RAM 60 (LSB) |
```

F=1 COMMAND PRESENT - SET BY I/O MICROPROCESSOR 36
F=0 COMMAND COMPLETED - SET BY LINE MICROPROCESSOR 56
R=1 MAIN MEMORY 4 BLOCK READ
R=0 MAIN MEMORY 4 BLOCK WRITE
LLLL LINE NUMBER (1 OF 16)
D=0 RECEIVE
D=1 TRANSMIT

MAILBOX 2 I/O MICROPROCESSOR 36 COMMANDS TO LINE MICROPROCESSOR 56

```
                      BIT POSITION
         WORD   0   1   2   3   4   5   6   7
            0 |         ACTION CODE           |
            1 | F | - | - | L | L | L | L | D |
            2 |         REASON CODE           |
```

F=1 COMMAND PRESENT - SET BY I/O MICROPROCESSOR 36
F=0 COMMAND COMPLETED - SET BY LINE MICROPROCESSOR 56
ACTION CODE - $00_{16}$ STOP IO
                $02_{16}$ CHANNEL INITIALIZE
                $04_{16}$ START I/O FROM CPU 2
                $06_{16}$ START I/O FROM ALL OTHERS
REASON CODE - BIT 0 CHANNEL REQUEST INTERRUPT
                   1 DATA SET SCAN
                   2 TIMER
                   7 TRANSMIT/RECEIVE (LOGICAL ONE = TRANSMIT CHANNEL/LOGICAL ZERO = RECEIVE CHANNEL)

MAILBOX 3 LINE MICROPROCESSOR 56 COMMANDS TO I/O MICROPROCESSOR 36

| WORD | BIT POSITION | | | | | | | |
|---|---|---|---|---|---|---|---|---|
| | 0 | 1 | 2 | 3 | 4 | 5 | 6 | 7 |
| 0 | COMMANDS | | | | | | | |
| 1 | F | - | - | L | L | L | L | D |
| 2 | DATA | | | | | | | |
| 3 | COMMANDS | | | | | | | |

F=1 COMMAND PRESENT - SET BY LINE MICROPROCESSOR 56
F=0 COMMAND COMPLETED BY I/O MICROPROCESSOR 36

COMMANDS - WORD 0
    BIT 0 LOAD
    BIT 1 STORE
    BIT 2 GET NEXT BLOCK
    BIT 3 INTERRUPT CPU 2
    BIT 4 BACK SPACE ONE CHARACTER
    BIT 5 TIMER 32
    BIT 6 INITIALIZE
    BIT 7 BACK A LINE

WORD 3
    BIT 0 SPECIAL TIMER

COMMUNICATION MULTIPLEXER USING A RANDOM ACCESS MEMORY FOR STORING AN ACKNOWLEDGE RESPONSE TO AN INPUT/OUTPUT COMMAND FROM A CENTRAL PROCESSOR

RELATED APPLICATIONS

The following U.S. patent applications filed on an even date with the instant application and assigned to the same assignee as the instant application are related to the instant application.

1. "A Communication Multiplexer Having Dual Microprocessors" by Kin C. Yu and Gary J. Goss, filed on Sept. 29, 1980 and having U.S. Ser. No. 192,126.

2. "A Communication Multiplexer Sharing A Free Running Timer Among Multiple Communication Lines" by Kin. C. Yu and Gary J. Goss, filed on Sept. 29, 1980 and having U.S. Ser. No. 191,626.

3. "A Communication Multiplexer Having A Variable Priority Scheme Using A Read Only Memory" by Gary J. Goss and Angelo David Kachemov, filed on Sept. 29, 1980 and having U.S. Pat. No. 4,385,382.

4. "A Communication Multiplexer Variable Priority Scheme" by Allen C. Hirtle and Gary J. Goss, filed on Sept. 29, 1980 and having U.S. Pat. No. 4,380,065.

5. "A Communication Multiplexer Having An Apparatus For Establishing A Single Line Priority" by Kin C. Yu and Angelo David Kachemov, filed on Sept. 29, 1980 and having U.S. Ser. No. 191,580.

BACKGROUND OF THE INVENTION

1. Field of the Invention

This invention relates generally to a data processing system in a communications environment and more specifically to the use of a random access memory to store responses to asynchronously generated information bus transfer cycles.

2. Description of the Prior Art

In a system having a plurality of subsystems coupled over a common bus, an orderly system must be provided by which bidirectional transfer of information may be provided between such devices. Such a system is described in U.S. Pat. No. 3,993,981 entitled "Apparatus for Processing Data Transfer Requests in a Data Processing System". Apparatus is included in each subsystem for requesting the area of the bus for the transfer of information to another one of the subsystems during an asynchronously generated bus transfer cycle. Response logic is also included in each subsystem for acknowledging the receiving of the information during the asynchronously generated transfer cycle.

Typical of the subsystems coupled to the system bus is a communication subsystem such as described in U.S. Pat. No. 4,261,033 issued Apr. 7, 1981 entitled "Communications Processor Employing Line Dedicated Memory Tables for Supervising Data Transfers". This communication subsystem is responsive to input/output commands received over the system bus from a central processing unit. Apparatus in the communication subsystem generates an acknowledge response if the communication controller receives the input/output command, and generates a negative acknowledge signal if the communication controller is not able to receive the input/output command. Since the bus transfers are asynchronous, delays in the response will reduce the overall throughput of the system.

Certain input/output commands require that communication control blocks stored in a random access memory be available to allow the execution of these commands. Apparatus in the communication subsystem generates a positive or negative acknowledge response to these input/output commands.

The apparatus requires a considerable amount of hardware and requires a number of logic steps in order to send a response out on the system bus.

The hardware required is reduced by the use of a microprocessor controlling communication lines through the use of channel control blocks stored in a memory. Such a system is described in U.S. Pat. No. 4,133,030 entitled "Control System Providing for the Transfer of Data in a Communications Processing System Employing Channel Dedicated Control Blocks". This system, however, limited the throughput by restricting the number of communication lines that could be processed.

It should be understood that the references cited herein are those which the Applicants are aware of and are presented to acquaint the reader with the level of skill in the art and may not be the closest reference to the invention. No representation is made that any search has been conducted by the Applicants.

OBJECTS OF THE INVENTION

Accordingly, it is a primary object of the invention to provide an improved communication subsystem for use in a data processing system.

It is another object of the invention to provide a communication subsystem having lower cost apparatus for providing responses to certain input/output commands from the central processing unit.

It is still another object of the invention to provide a communication subsystem having apparatus for generating a quick response over the system bus for improving overall system throughput.

SUMMARY OF THE INVENTION

A data processing system includes a central processing subsystem (CPU), a main memory, a plurality of peripheral subsystems, and a communication subsystem, all coupled in common to a system bus. The communication subsystem includes a communication multiplexer coupled to the system bus and a number of devices, typically cathode ray tube displays (CRTs) coupled to the communication multiplexer.

The CPU communicates with the communication multiplexer by sending input/output load commands to the communication multiplexer via the system bus. A number of input/output commands set up communication control blocks (CCB) in a first random access memory in the communication multiplexer which control the transfer of data bytes between the device and main memory. Each communication line between the devices and the communication multiplexer may operate as a receive channel or a transmit channel. There are 4 CCB's for each receive channel and 4 CCB's for each transmit channel of each communication line. Each CCB includes address locations for storing the main memory address, the range, a control byte, and status bytes. The main memory address initially is the starting address in main memory of the block of data bytes to be transferred between the device and main memory. The range is the number of data bytes in the block. The control byte indicates whether the communication multiplexer should interrupt the CPU when the CCB is completed, if the CCB is valid or if this CCB represents the last data block. The status bytes are originally set to ZERO and are read by an input next status input/output command when the CCB is completed to clear the CCB and indicate to the CPU certain conditions such as error, transmit underrun, interrupt, etc. which occurred during the processing of the data block.

An output address input/output command loads the main memory address bytes, an output range input/output command loads the range bytes, and an output control input/output command loads the control byte and clears the status bytes. The input next status input/output command transfers the status bytes to the CPU and clears the CCB. If all 4 CCB's associated with a channel are loaded with address and control bytes, then the communication multiplexer will reject the output address input/output command. If all CCB's associated with a channel are empty, the communication controller will reject the input next status input/output command.

As disclosed in U.S. Pat. No. 3,993,981 entitled "Apparatus for Processing Data Transfer Requests in a Data Processing System", information on the system bus received by an addressed subsystem requires an acknowledge, a not-acknowledge or a wait response sent on the system bus within a predetermined time. The output address input/output command or the input next status input/output command that is rejected results in the communication multiplexer not processing the input/output command and sending a not-acknowledge response to the CPU over the system bus.

The apparatus for generating a not-acknowledge response to an output address input/output command includes a second random access memory (RAM) for storing a not-acknowledge bit for each channel having no CCB available for receiving an address input/output command and for storing a not-acknowledge bit for each channel having all CCB's empty when receiving an input next status input/output command; a decoder for selecting the output address input/output command function code and the input next status input/output command function code; a first flop which sets in response to the not-acknowledge bit in a first state indicating no CCB is available for receiving an output address input/output command or all CCB's are empty when receiving an input next status input/output command to send a not-acknowledge response out on the system bus to the CPU; and a second flop which sets in response to the not-acknowledge bit in a second state indicating a CCB is available for receiving an output address input/output command or at least one CCB is available when receiving the input next status input/output command to send an acknowledge response out on the system bus.

If the CPU receives an acknowledge to the output address input/output command, then the CPU sends the output range input/output command and the output control input/output command to load the specified CCB. The output control input/output command clears the status bytes in the CCB.

A microprocessor is responsive to an initialization input/output command to control the loading of all address locations of the second RAM associated with the output address input/output commands with acknowledge bits in the second state to indicate that the CCB's are available; and the loading of all address locations of the second RAM associated with the input next status input/output command with not-acknowledge bits in the first state to indicate that no CCB is available.

The output address input/output command will cause the I/O microprocessor to write a not-acknowledge bit in the first state in the address location of the second RAM associated with the previous output address input/output command if the contents of a difference counter stored in an address location in the first random access memory indicate that all CCB's for these channel numbers are full. The output address input/output command will cause the I/O microprocessor to write the not-acknowledge bit in the second state in the address location of the second RAM associated with the input next status input/output command indicating that at least one of the 4 CCB's is loaded.

Similarly, the input next status input/output command will cause the I/O microprocessor to write a not-acknowledge bit in the first state in the address location of the second RAM associated with the input next status input/output command if the contents of the difference counter indicate that after clearing this CCB, all 4 CCB's are empty. The I/O microprocessor will write a not-acknowledge bit in the second state in the address location of the second RAM associated with the output address input/output command to indicate that at least one CCB is empty.

The novel features which are believed to be characteristic of the invention both as to its organization and method of operation, together with further objects and advantages, will be better understood from the following description when considered in connection with the accompanying drawings. It is expressly understood, however, that each of the drawings is given for the purpose of illustration and description only and is not intended as a definition of the limits of the present invention.

BRIEF DESCRIPTION OF THE DRAWINGS

FIG. 2 is an overall block diagram of the communication controller 10.

FIG. 3 is a logic diagram of the I/O microprocessor 36 and line microprocessor 56 interrupt logic FIG. 4 identifies the address locations of the read only memories and the random access memories in communication controller 10.

FIG. 5 shows the layout of the mailboxes in shared memory 44.

DESCRIPTION OF THE PREFERRED EMBODIMENT

Figure 1:
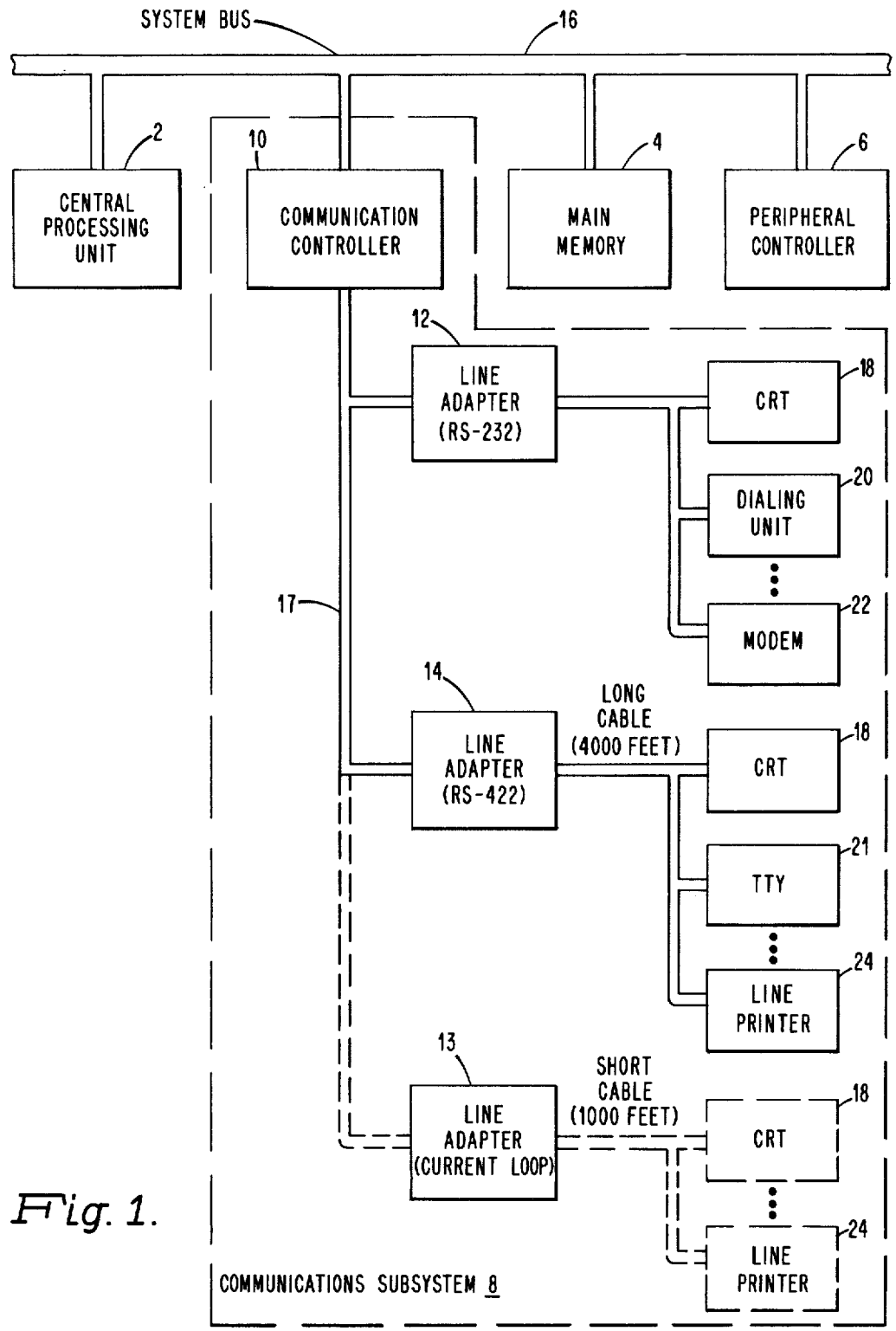
FIG. 1 is an overall block diagram of the data processing system.

FIG. 1 shows a block diagram of the overall data processing system including a central processing unit (CPU) 2, a main memory 4, a communication subsystem 8 and typically a peripheral controller 6, all coupled in common to a system bus 16.

The communication subsystem 8 may be operative with a maximum of 16 communication lines and includes a communication controller 10 coupled to system bus 16, and a plurality of line adapters with their associated devices coupled to the communication controller 10 by a line adapter bus 17.

Typically, communication subsystem 8 may include a line adapter 12 having RS232 interfaces, a line adapter 14 having RS422 interfaces or a line adapter 13 having current loop interfaces. Line adapter 14 has the capability of driving up to 4000 feet of cable and line adapter 13 has the capability of driving up to 1000 feet of cable.

The RS232 interface is described in "EIA RS-232C" dated 1979 and published by the Electronics Industries Association, 2001 I Street, N.W., Washington, DC.

The RS422 interface is described in "EIA RS-422" dated 1975 and also published by the above Electronics Industries Association.

The current loop interface is described in the "Bell System Communication—Technical Reference—45, 55 and 75 Baud Printer Line Channels—Interface Specification" which is dated December, 1967 and published by AT&T.

Typical devices operative with the communication controller 10 include a cathode ray tube display (CRT) 18, a dialing unit (801C) 20, a MODEM (202C) 22, a teletype unit (TTY33) 21, and a line printer 24.

Line adapters 13 and 14 may each service up to eight asynchronous lines; line adapter 12 may service up to eight asynchronous lines or up to six asynchronous lines and one synchronous line. However, only two line adapters servicing a maximum of 16 lines may be operative with the communication controller 10.

FIG. 2 shows a block diagram of communication controller 10 which includes an I/O microprocessor 36 which controls the operation of the communication controller 10 with CPU 2 and main memory 4 over system bus 16, and line microprocessor 56 which controls the operation of the communication controller 10 with the line adapters 12 and 14 over line adapter bus 17.

The I/O microprocessor 36 and the line microprocessor 56 communicate with each other through a shared random access memory (RAM) 44 which stores the line control tables (LCT) and communication control blocks (CCB) and a number of mailboxes. Each of the devices is assigned an LCT. Half of the LCT controls the device in a receive mode and the other half of the LCT controls the device in a transmit mode. Similarly, each of the devices is assigned a CCB for each receive block transfer with main memory 4, and a CCB for each transmit block transfer with main memory 4. The LCT and CCB operations are described in the aforementioned U.S. Pat. No. 4,133,030 which is hereby incorporated by reference.

Line control tables identify the number of bits in the device data character, whether the character is odd or even parity, the cycle redundancy check (CRC) formula used and the CRC bytes being developed, the status of the device and pointers to enable the LCT to be operative with a channel control program (CCP).

The CCB stores the main memory 4 address location for the next character either transmitted or received, and the number of characters remaining for processing in the current block. The CCB also stores a control word indicating the last block for transmission, if the CCB was executed, and whether to generate an interrupt upon completion of a block, and a number of status bits indicating the line status at the time the CCB completed. Up to four receive CCB's and up to four transmit CCB's may be stored per device.

A programmable read only memory (PROM) 38 stores the programs that operate with the I/O microprocessor 36. The I/O microprocessor generates signals indicative of an address location in PROM 38 and sends the signals via an I/O paging logic 34 and an I/O address bus 18 to PROM 38. An instruction at that address location is transferred from PROM 38 to the I/O microprocessor 36 via an I/O data bus 74. The I/O microprocessor 36 executes that instruction and generates the address signals indicating the next address location of PROM 38 to read the next instruction over I/O data bus 74.

A work RAM 40 operates with the I/O microprocessor 36 as a scratchpad memory for storing variable data, for stack operation, i.e., storing the return address of an interrupted microprogram, and for providing working storage for data manipulation.

The I/O paging logic 34 receives a virtual address from I/O microprocessor 36 when the I/O microprocessor addresses the LCT or CCB area of shared memory 44 and generates a real address for identifying a location with the LCT or CCB area of a particular channel associated with a selected device. The paging operation is described in U.S. Pat. No. 4,290,104 issued Sept. 15, 1981 entitled "Paging Mechanism".

A bus interface 30 couples the communication controller 10 to the system bus 16 for operation with main memory 4 and CPU 2. The bus request, bus acknowledge, and bus priority operations are described in U.S. Pat. No. 3,993,981 entitled "Apparatus for Processing Data Transfer Requests in a Data Processing System" which is hereby incorporated by reference. Bus interface 30 also provides storage for data and I/O commands that are transferred over system bus 16.

A RAM 60 stores the channel control program (CCP) which processes the data stream of a communication channel. A CCP pointer in the LCT points to the next CCP location in RAM 60 to be referenced by the channel when a channel request interrupt is serviced. The CCP typically controls the transfer of characters between a line adapter interface 66 and shared RAM 44 through line microprocessor 56, performs the check redundant character computation and performs minor editing.

A PROM 58 stores the programs that operate with the line microprocessor 56. The line microprocessor 56 generates address signals indicating an address location in PROM 58 and sends the address signals via a line paging logic 54 and a line address bus 70 to PROM 58. An instruction at that address location is transferred from PROM 58 to line microprocessor 56 via a line data bus 72. The line microprocessor 56 executes that instruction and generates the address signals indicating the next address location of PROM 58 to read the next instruction over line data bus 72.

A work RAM 52 operates as a scratchpad memory for line microprocessor 56 as does work RAM 40 for I/O microprocessor 36.

Line paging logic 54 receives a virtual address which is converted into a real address when addressing the LCT or CCB areas in shared RAM 44. As with I/O paging logic 34, line paging logic 54 allows a single program to address the LCT or CCB associated with any communication channel (2 channels per line: a receive channel and a transmit channel).

An S register 50 is a one byte index register which is operative with PROM 58.

A pause timer 62 detects if a CCP is running too long by counting the number of accesses to RAM 60. If the number of accesses exceeds a predetermined number, typically 100, the line microprocessor 56 is interrupted, the CCP is temporarily deactivated, and a CCP return address is stored in a queue in work RAM 52.

A priority scan 64 accepts data requests associated with each channel of the device adapters and establishes the priorities for servicing the channels in a dynamically variable sequence. This is described in copending related U.S. Pat. No. 4,385,382 which issued May 24, 1983 entitled "A Communication Multiplexer Having a Variable Priority Scheme Using A Read Only Memory" and U.S. Pat. No. 4,380,065 which issued Apr. 12, 1983 entitled "A Communication Multiplexer Variable Priority Scheme".

The line adapter interface 66 couples the line adapters 12 and 14 to the communication controller 10 through line adapter bus 17.

The I/O microprocessor 36 implements a number of functions including the handling of I/O instructions from the CPU 2 to the communication controller 10 and the controlling of the transfer of data between line microprocessor 56 and main memory 4. Line microprocessor 56 in conjunction with PROM 38 acts as an interpreter of the CCP. When a CCP instruction which requests a byte to be transferred to/from main memory 4 is decoded by line microprocessor 56, it stores the number of the channel currently being serviced and the data byte of the transfer in the mailbox in shared memory 44. The line microprocessor 56 generates an interrupt through an interrupt logic 78 to the I/O microprocessor 36. The I/O microprocessor 36 in conjunction with PROM 38 will address the mailbox in shared RAM 44 for the channel number and command code as well as the data byte, if this is a receive operation, and address the current CCB of this channel via I/O paging logic 34 for the current main memory address. The I/O microprocessor 36 will transfer the memory address and the data byte to bus interface 30 where the main memory 4 address and the data byte are stored awaiting an acknowledge in response to a bus request for transfer to main memory 4.

Interrupt logic 78 is also responsive to signals from bus interface 30 to interrupt the I/O microprocessor to accept system bus 16 information addressed to communication controller 10.

Interrupt logic 78 is also responsive to a signal from pause timer 62 to interrupt line microprocessor 56 when the number of CCP instructions exceeded the predetermined number; responsive to a signal from priority scan 64 to interrupt line microprocessor 56 to start a polling of the devices; andd responsive to a signal from line adapter 66 to interrupt the line microprocessor 56 when a device responds to the poll.

The I/O microprocessor 36, in conjunction with a free running timer 32, may indicate to the line microprocessor 56 to start a predetermined operation after a time delay determined by the line microprocessor 56. The free running timer 32 is described in related copending U.S. application Ser. No. 191,626 entitled, "A Communication Multiplexer Sharing A Free Running Timer Among Multiple Communication Lines".

A clock system 76 generates the phase 1 and phase 2 clock signals for I/O microprocessor 36 and line microprocessor 56 as well as a number of timing signals which are described infra.

The I/O microprocessor 36 when receiving an I/O command from CPU 2 may generate an I/O instruction to line microprocessor 56 through a mailbox in shared memory 44 in order to control the CCP stored in RAM 60.

A transceiver (XCVR) 46 and a XCVR 48 isolate the I/O data bus 74 from the line data bus 71. Similarly, a MUX and control 42 isolates the I/O address bus 68 from the line address bus 70 and couples shared RAM 44 to either I/O address bus 68 or line address bus 70.

Referring to FIG. 3, signal LRDADY-01 or LREADY-02 at logical ZERO indicates that a device on a communication line coupled to line adapter 12 or 14 requests service by responding to the poll by priority scan 64. Forcing signal LREADY— to logical ZERO resets a flop 100 on the rise of a clock signal PRICLK—. Output signal LRDYSY— at logical ZERO is applied to an input of a NAND gate 102. Signal STLOAD—, the output of priority scan 64, is at logical ZERO during the polling operation as described in copending related U.S. Pat. No. 4,385,382 entitled "A Communication Multiplexer Having A Variable Priority Scheme Using A Read Only Memory".

A flop 106 sets on the next rise of clock signal PRICLK— since the D input signal HITVAL+, the output of a NAND gate 102, is at logical ONE. This forces the output signal UP2IRQ— to logical ZERO, thereby forcing line microprocessor 56 into an interrupt sequence. Line microprocessor 56 generates addresses FFF8$_{16}$ and FFF9$_{16}$ on address lines U2AD00+00 through U2AD15+00 through line paging logic 54 onto line address bus 70 and begins to process instructions stored in PROM 58 and CCP's stored in RAM 60. Signal PRSCCP+ is forced to logical ZERO by logic responsive to address signals FFF8$_{16}$ and FFF9$_{16}$ in line paging logic 54. This sets a flop 108. Signal CCPRUN— at logical ZERO resets flop 106 and signals the priority scan 64 that the CCP is active. Interrupt signal UP2IRQ— is forced to logical ONE.

The CCP's control the operation of the communication lines. Each instruction of the CCP calls for a program routine in PROM 62. Line microprocessor 56 performs the instructions of the program routine to perform the CCP instruction.

When the link microprocessor 56 has completed its operation with the communication line, it generates an address 00F1$_{16}$. Line paging logic 54 is responsive to address 00F1$_{16}$ and generates signal LNMREF— at logical ZERO. A decoder 164 is activated and signal LRQIRQ— is forced to logical ZERO. This sets a flop 166 and output signal UP1IRQ— at logical ZERO forces I/O microprocessor 36 into an interrupt mode.

I/O microprocessor 36 generates addresses FFF8$_{16}$ and FFF9$_{16}$. Signal U1CRIQ— from I/O paging logic 34 is responsive to address FFF8$_{16}$ and resets flop 166. The I/O microprocessor 36 is controlled by the program routine stored in PROM 38 to process data in accordance with command signals stored in the mailbox in shared memory 44 by line microprocessor 56.

The CPU 2 may control the communication controller 10 by sending I/O commands over system bus 16. These I/O commands set up the LCT's and CCB's or read the LCT's and CCB's. As an example, one input/output command will set the main memory 4 address in a CCB. Another input/output command will set the range in that CCB.

Bus interface 30 generates signal IOCMMD+ when an input/output command is received from CPU 2 over system bus 16. Output signal IOCMMD+ sets a flop 128 on the rise of timing signal MYD100+ from bus interface 30. Interrupt signal UP1NMI— at logical ZERO is applied to the non-maskable interrupt input terminal of I/O microprocessor 36 which generates interrupt vector addresses FFFC$_{16}$ and FFFD$_{16}$. The input/output command includes a function code which modifies interrupt vector address FFFC$_{16}$ in the I/O paging logic 34 to point to an address location in PROM 38 which stores the starting address of the program which executes the input/output command specified by the function code. Interrupt vector address FFFC$_{16}$ generates signal NM1CLR— in I/O paging logic 34 to reset flop 128.

A flop 126 sets on the rise of the TBORW1— signal from pause timer 62 when the pause timer 62 times out. Interrupt signal UP2NMI— at logical ZERO is applied to the non-maskable interrupt terminal of line microprocessor 56 which generates interrupt vector addresses FFFC$_{16}$ and FFFD$_{16}$. The contents of address locations FFFC$_{16}$ and FFFD$_{16}$ in PROM 58 generate a program address for processing the pause timer 62 time out. Flop 126 is reset during a stop timer or a WAIT instruction when signal PTMRSB—, the output of decoder 164, is forced to logical ZERO.

A number of timing and control signals are applied to the input terminals of I/O microprocessor 36 and line microprocessor 56. Signals P1PHZ1+, P1PHZ2+, P2PHZ1+ and P2PHZ2+ applied to the ∅1 and ∅2 terminals provide the basic timing. Signal CKPHZA— applied to the F2 terminal enables the data bus during a microprocessor write cycle and disables the data bus during a microprocessor read cycle. The signals P1HALT— and P2HALT— at logical ZERO applied to the HALT terminal will halt the microprocessor after the instruction is executed. Signal MSTCAD— applied to the R terminal starts the microprocessor when power is turned on.

Figure 4:
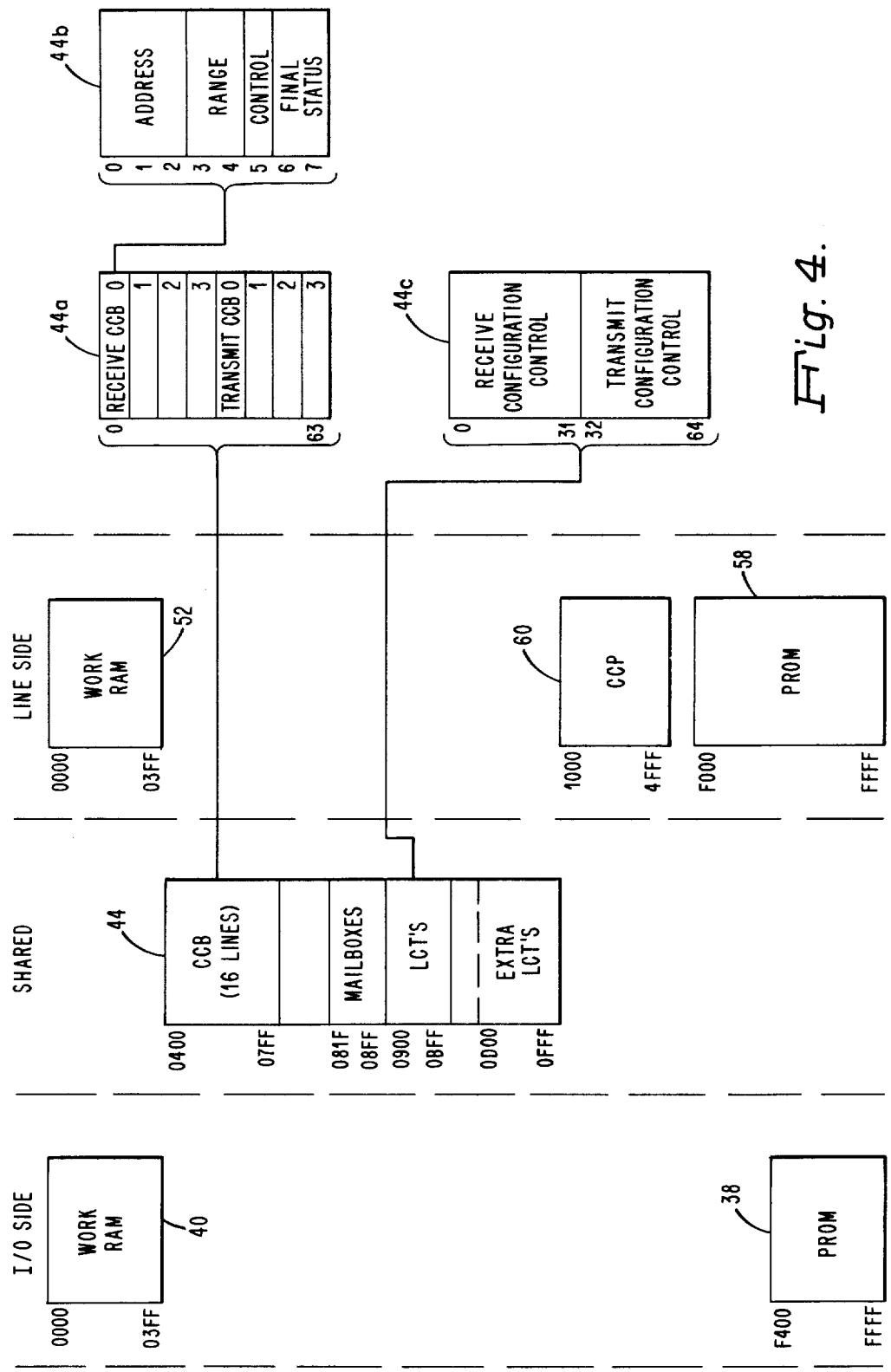

FIG. 4 identifies the address locations of the various memories that are operative with either the I/O microprocessor 36 (I/0 side), the line microprocessor 56 (line side), or both the I/O microprocessor 36 and the line microprocessor 56 (shared). Work RAM's 40 and 52 are responsive to address signals 0000$_{16}$ through 03FF$_{16}$ received from I/O address bus 68 and line address bus 70, respectively.

Shared memory 44 is responsive to adddress signals 0400$_{16}$ through 0FFF$_{16}$ received from I/O address bus 68 or line address bus 70. Shared memory 44 has 3,072 address locations: 1,024 address locations for storing CCB's for 16 communication lines, 1.024 address locations for storing LCT's for 16 communication lines, 10 address locations for storing mailboxes and the remaining address locations for storing extra LCT's. Each communication line is operative with CCB's 44a in 64 address locations: 32 address locations for the communication line as a receive channel and 32 address locations for the communication line as a transmit channel. Each receiver channel CCB and each transmit channel CCB includes 8 bytes storing 3 bytes of main memory 4 address location, 2 bytes of range, 1 byte of control and 2 bytes of status. Each LCT 44c includes 32 address locations of receive channel configuration and control information and 32 address locations of transmit channel configuration and control information.

RAM 60 includes 16,384 locations, with addresses 1000$_{16}$ through 4FFF$_{16}$ for storing CCP instructions which are under the control of line microprocessor 56.

PROM 38 has 3,072 locations, with addresses F400$_{16}$ through FFFF$_{16}$ for storing program instructions that operate with I/O microprocessor 36. PROM 58 has 4,096 locations, with addresses F000$_{16}$ through FFFF$_{16}$ for storing program instructions that operate with line microprocessor 56.

Each channel has associated with it four 8 byte CCB's 44b, each including 3 bytes of main memory 4 address of the next data byte to be processed by that channel, 2 bytes of range, the number of data bytes remaining in the field, 1 control byte and 2 status bytes.

The CCB control byte includes an "interrupt on status complete" bit, a "valid CCB" bit and a "last block" bit.

The CCB final status bytes include bits indicating:

| Bit position | |
|---|---|
| | (0 = most significant bit) |
| 0 | The CCP executes a CPU 2 interrupt instruction. |
| 1 | An interrupt was generated for this CCB. |
| 2 | Data Service Error. |
| 3 | CCB was executed and status is complete. |
| 4 | CCB Service Error since CCB not available. |
| 5,6 | Flag between CCP and CPU 2. |
| 9 | Data Clock Error. |
| 10 | Range not equal to zero when in receive mode. Last block bit of CCB control word set in transmit mode. |
| 11 | Data set status changed. |
| 12 | Memory 4 error corrected. |
| 13 | Invalid memory 4 address. |
| 14 | System bus 16 parity error. |
| 15 | Uncorrected memory 4 error. |

The I/O microprocessor 36 and line microprocessor 56 communicate with each other by means of mailboxes stored in locations in shared RAM 44. The contents of these mailbox locations are shown in FIG. 5.

The communication controller 10 uses three mailboxes: (a) block mode commands, (b) I/O microprocessor 36 commands to line microprocessor 56, and (c) line microprocessor 56 commands to I/O microprocessor 36.

The CPU 2 may initiate a block read operation or a block write operation by means of I/O commands. As a result of the input/output command when the mailbox is available (F = logical ZERO), the block mode command mailbox is set up with an address in the line microprocessor address space. This is the address of the first location to receive a byte from shared memory 44 if the D bit, bit 7 of word 0, is at logial ZERO, or from which to transmit a byte to shared memory 44 if the D bit is at logical ONE.

Bit positions 3 through 6 of word 0 specify the channel number of the communication line requiring the block transfer. The CCB stored in shared memory 44 associated with that channel specifies the starting main memory 4 address and the range, the number of bytes in the block, involved in the block transfer.

The R bit, bit 1 of word 0, when at logical ONE specifies a main memory 4 block read operation and when at logical ZERO, a main memory 4 block write operation.

The F bit, bit 0 of word 0, is set to logical ONE by I/O microprocessor 36 to specify that a command is present, and is reset to logical ZERO by the line microprocessor 56 when the command is completed.

The line microprocessor 56 scans word 0 of block mode command mailbox. If bit 0 of word 0 is at logical ONE, then the line microprocessor 56 initiates a firmware routine which identifies the channel number and determines if this is a read or write operation. If this is a read operation, then the STORE subroutine is processed. If this is a write operation, then the LOAD subroutine is processed. When the range as stored in the CCB for this channel number reaches ZERO, the line microprocessor 56 resets the F bit, bit 0 of word 0, and terminates this block mode operation.

The I/O microprocessor 36 commands to line microprocessor 56 mailbox 2 specifies the action the line microprocessor 56 is to take and the reason for the action. Word 0 specifies the action code. Action code $00_{16}$ specifies a stop I/O command which prevents any further channel activity by halting the CCP program and preventing further data-generated channel request interrupts from the channel specified in word 1. Action code $02_{16}$ initializes the channel by clearing the CCB's and LCT's associated with the channel number specified in word 1.

Action code $04_{16}$ starts the CCP execution at an address specified by the LCT words 6 and 7 associated with the channel specified in word 1. This LCT address is specified by CPU 2 initially by an I/O command.

Action code $06_{16}$ starts the CCP execution as the result of an interrupt from a communication channel. The CCB for that channel specifies the starting CCP address location.

Word 2 of the I/O microprocessor 36 commands to line microprocessor 56 mailbox 2 specifies the reason code. Bit 0 at logical ONE indicates a channel request interrupt.

Bit 1 identifies a data set scan operation. The data scan routine compares the present status with the old status stored in LCT 14. A difference indicates that a particular channel status has changed. The contents of LCT 8 then determine the action the line microprocessor 56 will take.

Bit 2 indicates that the timer 62 which was set by the CCP has timed out.

Bit 7 indicates the direction of the line, receive or transmit.

The line microprocessor 56 reads the F bit of word 1. When bit 0 is at logical ONE, the line microprocessor 56 reads word 0 and branches to a subroutine specified by the action code. Bit 0 of word 1 is reset to logical ONE when the action is completed.

The line microprocessor 56 commands to I/O microprocessor 36 mailbox 3 is active during a request by a line adapter 12 or 14 for service causing the line microprocessor 56 to start the processing of the CCP instruction specified by the commands stored in the mailbox 3.

Bit position 0 of word 0 of mailbox 3 at logical ONE specifies a load DMA read from main memory 4 command at an address specified by the CCB of the channel number stored in word 1 of mailbox 3.

The data bytes read from memory are stored in word 2 of the line microprocessor 56 command to I/O microprocessor 36 mailbox 3. Line microprocessor 56 processes the data bytes in accordance with the CCP as each data byte is stored in the mailbox under control of the I/O microprocessor 36.

Bit position 1 of word 0 at logical ONE specifies a store DMA write into main memory 4 at an address specified by the CCB of the channel number stored in word 1. The data bytes are stored in word 2 of the mailbox 3 under control of line microprocessor 56 and transferred to main memory 4 via system bus 16 under control of I/O microprocessor 36.

Bit position 2 of word 0 at logical ONE specifies a get next block (GNB) command. This indicates to the I/O microprocessor 36 that the block transfer is complete and to clear the CCB control field.

Bit position 3 of word 0 at logical ONE results in the I/O microprocessor 36 interrupting CPU 2 and in conjunction with bit position 2 at logical ONE (GNB) will result in an I/O command from the CPU 2 loading the CCB for another block transfer.

Bit position 4 of word 0 at logical ONE indicates a backspace one character operation. A CRT 18 operator may want to correct a character.

Bit position 5 of word 0 at logical ONE indicates that the timer 32 is in an "ON" condition.

Bit position 6 of word 0 at logical ONE indicates an initialize operation.

Bit position 7 of word 0 at logical ONE indicates the backing up of a line. The CRT 18 operator may want to correct a line.

Bit position 0 of word 3 indicates a special 200 millisecond pause timer 62 operation.

Figure 6:
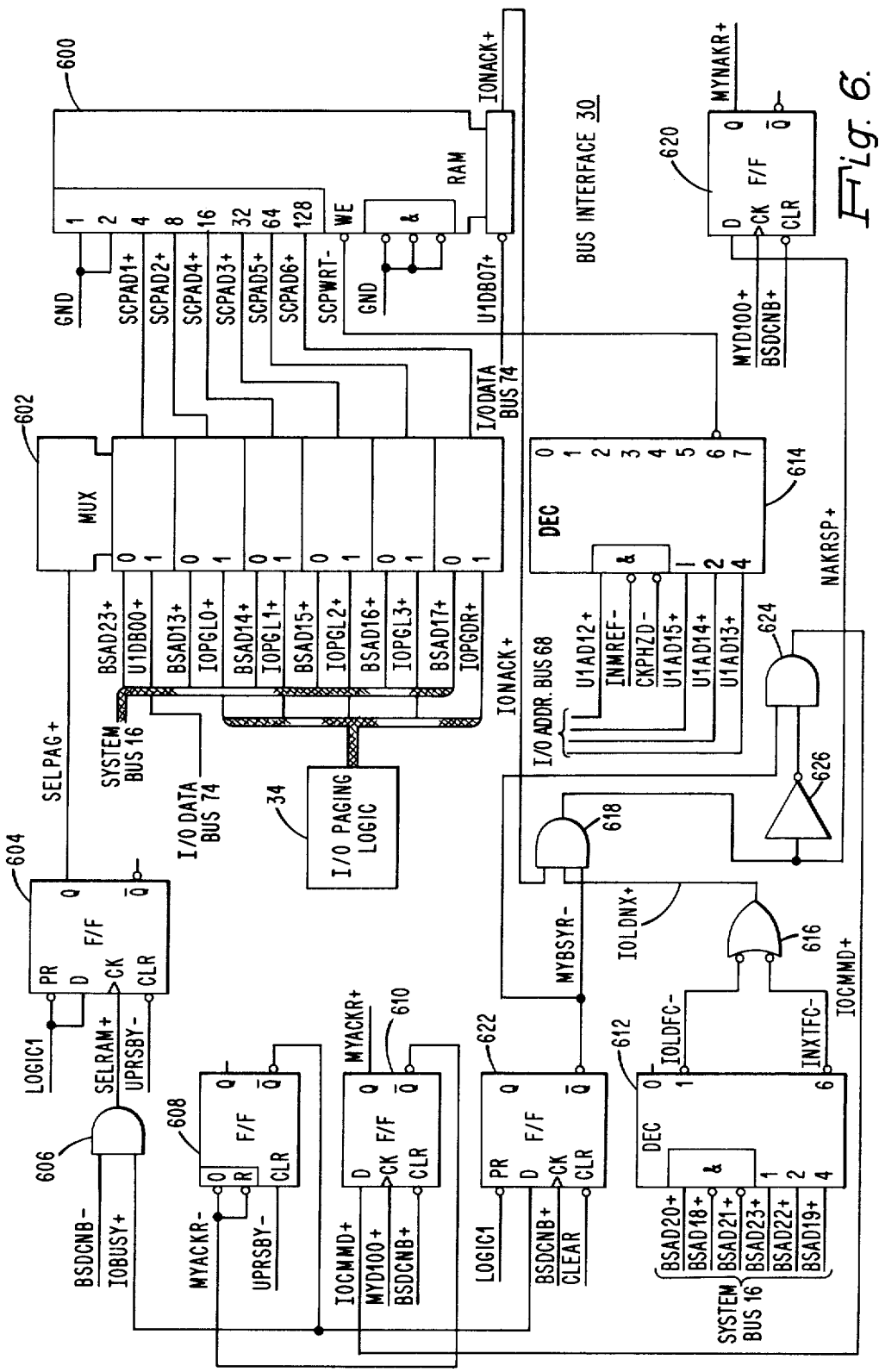
FIG. 6 is a logic diagram of the portion of bus interface 30 that generates the positive and negative acknowledge signals in response to an input/output command.

FIG. 6 shows a portion of the logic of bus interface 30. The communication controller 10 accepts information on system bus 16 having the address of the communication controller 10. This information includes the function code identifying the input/output command from CPU 2 and the channel number of the communication line that will execute this input/output command.

Input/output commands write the main memory address and the range into the CCB's and also read the status bytes from the CCB's. The output address input/output command, function code $09_{16}$, tests for an available CCB by addressing a random access memory 600 with the channel number included in the input/output command and setting a flop 610 if a CCB is available for that channel number; or setting a flop 620 if a CCB is not available for that channel number. If the CPU 2 receives an acknowledge response, signal MYACKR+ at logical ONE, then CPU 2 sends the range input/output command for that channel number. If no CCB is available, then the CPU 2 receives a not-acknowledge response to the output address input/output command. The output address input/output command is not processed by the communication controller 10 and the range input/output command is not sent to the communication controller 10 from CPU 2.

The CPU 2 sends an input next status input/output command, function code $1A_{16}$, to read the status bytes of the next CCB of the channel number in the input/output command to be processed. If that CCB is empty, then flop 620 is set and a not-acknowledge response is sent to CPU 2. If that CCB contains status information, then flop 610 is set and an acknowledge response is sent to CPU 2 and the status bytes from that CCB are sent out on system bus 16 to CPU 2.

An input/output command includes a channel number, signals BSAD13+ through BSAD17+, and a function code, signals BSAD18+ through BSAD23+. Signal BSAD23+ at logical ONE indicates an output input/output command and at logical ZERO indicates an input input/output command.

When an input/output command is received by the communication controller 10, signals BSAD13+ through BSAD17+ and BSAD23+ are applied to RAM 600 via a multiplexer (MUX) 602 and signals SCPAD1+ through SCPAD6+ to generate signal IONACK+ at logical ONE for a not-acknowledge response to CPU 2.

Signals BSAD18+ through BSAD23+ are applied in the input of a decoder 612 to generate signal IOLDFC− at logical ZERO for an output address input/output command or signal INXTFC− at logical ZERO for an input next status input/output command. These signals are applied to a NOR gate 616 for generating a signal IOLDNX+ at logical ONE. Since signal MYBSYR− is at logical ONE, signal NAKRSP+ is at logical ONE and flop 620 sets on the rise of timing delay signal MYD100+ and signal MYNAKR+ is sent out on system bus 16 as a not-acknowledge response. Flop 620 is then reset. Signals MYD100+, BSDCNB− and BSDCNB+ are part of the system bus 16 response logic as described in the aforementioned U.S. Pat. No. 3,993,981. If signal IONACK+ was at logical ZERO, then signal NAKRSP−, the output of an inverter 626, is at logical ONE. This forces output signal IOCMMD+ to logical ONE causing flop 610 to set on the rise of timing delay signal MYD100+. Flop 128 of FIG. 3 also sets on the rise of timing delay signal MYD100+ interrupting I/O microprocessor 36 to initiate the input/output command sequence. Signal MYACKR+ at logical ONE is sent out on system bus 16 indicating an acknowledge response to CPU 2.

RAM 600 is loaded initially under I/O microprocessor 36 control in response to an initialize input/output command, function code $01_{16}$. A flop 604 is set when the acknowledge response to the initialize input/output command is sent out on system bus 16 by output signal MYACKR+ from flop 610. Clock signal SELRAM from an AND gate 606 rises, setting flop 604 and activating terminal 1 of MUX 602 since signal SELPAG+ is at logical ONE. I/O microprocessor 36 generates successive channel numbers by address signals IOPGL0+ through IOPGOR+ in I/O paging logic 34 which are applied to the address terminals of RAM 600 via signals SCPAD2+ through SCPAD6+. I/O microprocessor 36 generates data signals U1DB00+ through U1DB07+ at $00_{16}$ and $81_{16}$ for each channel number. This forces a logical ONE in each RAM 600 location addressed by the input next status input/output command channel number and a logical ZERO in each RAM 600 location addressed by the output address input/output command channel number. Pointers stored in work RAM 40 indicate the condition of the 4 CCB's for each channel number.

An active pointer indicates the CCB that is currently being processed. A load pointer indicates which CCB will be written into next. A status pointer indicates the last CCB completed. A difference pointer indicates the number of CCB's empty. There is a set of pointers for each channel number.

Initially the active and the load pointers are preset to binary 01 and the status and difference pointers are preset to binary 00. The output address input/output command is received by the communication controller 10, an acknowledge is sent to CPU 2 since output signal IONACK+ is at logical ZERO for all output address input/output commands, and the address is written into byte positions 0, 1 and 2 of CCB 1 as indicated by the load pointer set at binary 01. The output range input/output command is received and the range loaded into byte positions 3 and 4 of CCB 1. The output control input/output command is received and written into byte positions 5 and 6 of CCB 1.

Figure 7:
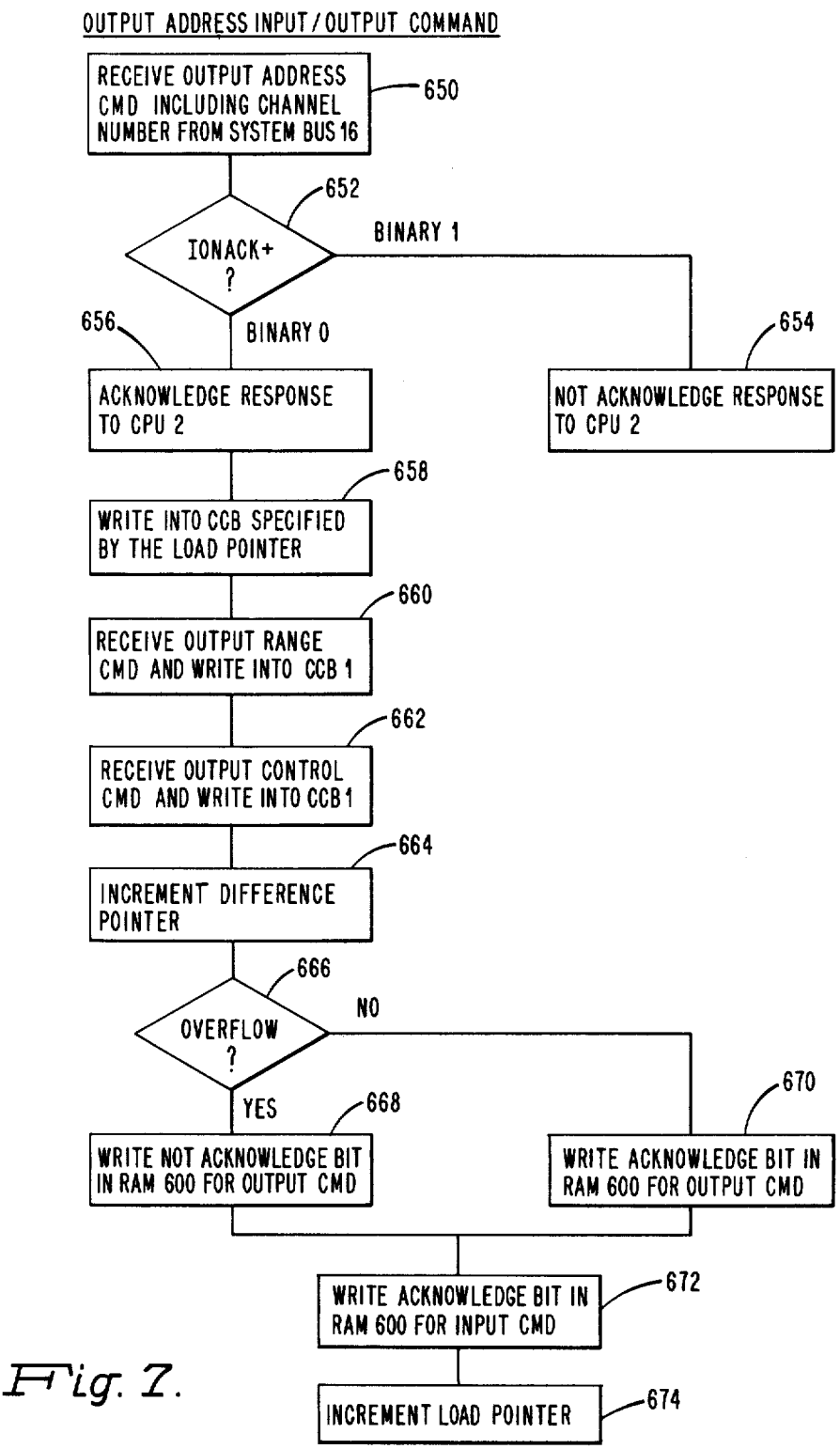
FIG. 7 shows a block diagram of the Output Address input/output command response operation.

FIG. 7 is a flow diagram showing the loading of a CCB for a channel number specified by the input/output command. The CPU 2 generates 3 input/output commands to load a CCB. If the output address input/output command is acknowledged, then the output range input/output command and the output control input/output command are sent by the CPU 2 to the communication controller 10. Block 650 shows the communication controller 10 receiving the output address input/output command from system bus 16. Bus address signals BSAD13+ through BSAD17+ and BSAD23+ of FIG. 4 specifying a channel number select output signal IONACK+ from RAM 600 via MUX 102. Bus signals BSAD18+ through BSAD23+ specifying the function code $09_{16}$ for the output address input/output command force output signal IOLDFC− to logical ZERO, forcing output signal IOLDNX+ of NOR gate 616 to logical ONE. In block 652, signal IONACK+ at logical ONE, applied to AND gate 618, sets the not-acknowledge flop 620 in block 654 and signal IONACK+ at logical ZERO sets the acknowledge flop 610 in block 656. CPU 2 receiving the acknowledge signal sends the output range input/output command in block 660 and output control input/output command in block 662. The address, range and control bytes are written into the CCB specified by the load pointer in block 658.

The difference pointer is incremented in block 664. The binary value of the difference pointer indicates the number of CCB's that are full. Binary 00 indicates that all 4 CCB's are empty, binary 01 indicates that 3 CCB's are empty, binary 10 indicates that 2 CCB's are empty, and binary 11 indicates that 1 CCB is empty. Filling the last CCB and incrementing the difference pointer give a binary value of 00 with an overflow indicating that there are no CCB's available for the next output address input/output command. If in block 666 there is an overflow, then in block 668 under I/O microprocessor 36 control address signals U1AD08+ through U1AD15+ are forced to $FE_{16}$ enabling a decoder 614. Hexadecimal F forces signal INMREF− to logical ZERO and when clock signal CKPHZD is at logical ZERO, output signal SCPWRT− enables the write terminal of RAM 600. The I/O microprocessor 36 generates $80_{16}$ over I/O data bus 74 of FIG. 2. Since flop 608 was set, flop 604 is set selecting input terminals 1 of MUX 602. Channel number signals IOPGL0+ through IOPGL3+ and IOPGDR+ are applied to the address terminals of RAM 600 through MUX 602 and signals SCPAD2+ through SCPAD6+. Also, data byte signal U1DB00+ is at logical ONE and signal U1DB07+ is at logical ZERO forcing the address location associated with the channel number of the output address input/output command to logical ONE.

If no overflow resulted in block 666, then in block 670 the I/O microprocessor 36 generates $81_{16}$ over I/O data bus 74. Data byte signal U1DB07+ at logical ONE forces the address location associated with the channel number of the output address input/output command to logical ZERO. Note that RAM 600 has an inverting input. The next output address input/output command addressing this channel number location will result in an acknowledge response to CPU 2.

In block 672, the I/O microprocessor 36 will generate $01_{16}$ over I/O data bus 74 and force a binary ZERO into the address location associated with the channel number of the input next status input/output command, signal U1DB00+ is at logical ZERO. When the input next status input/output command is received, an acknowledge response will be sent to CPU 2.

Figure 8:
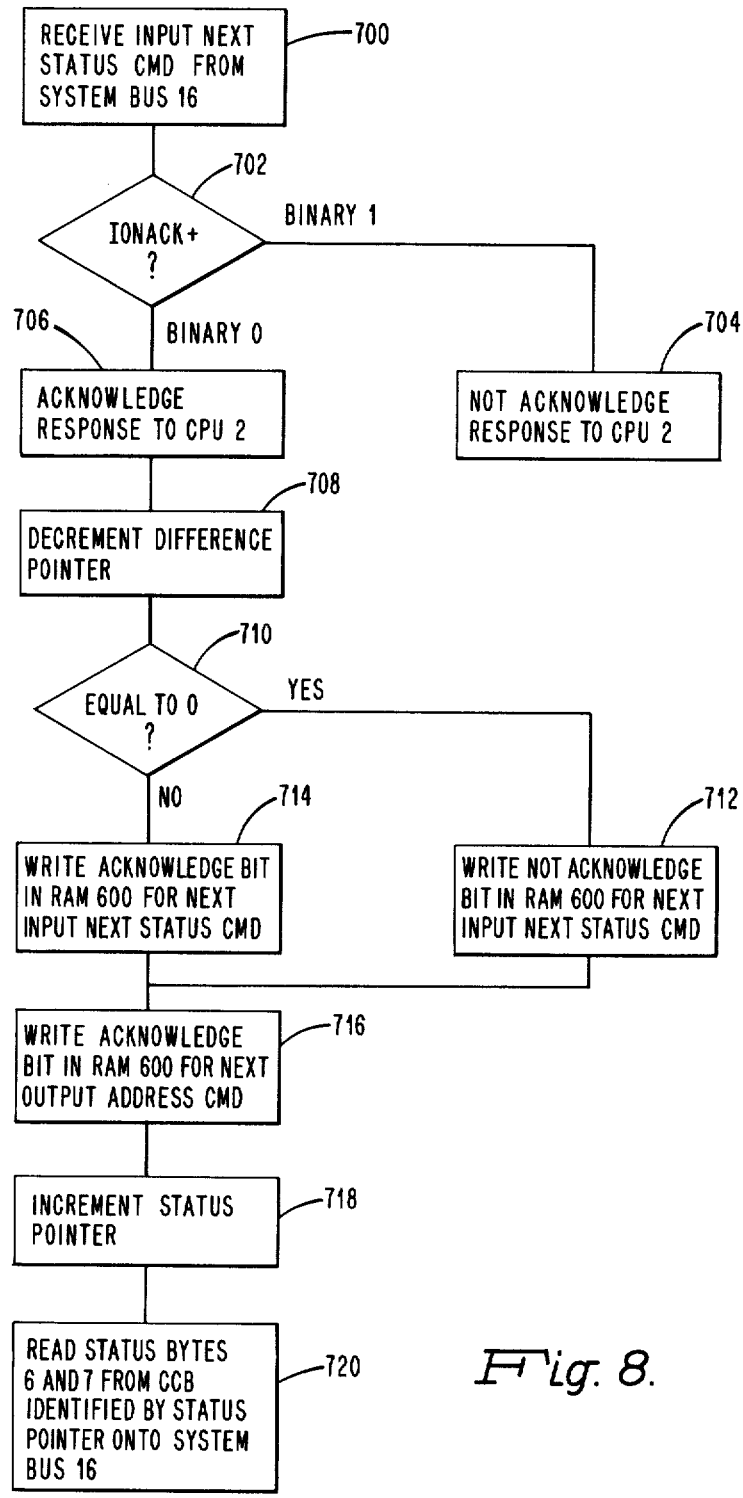
FIG. 8 shows a block diagram of the Input Next Status input/output command response operation.

FIG. 8 is a flow diagram showing the sequence of operations when the input next status is read from a CCB to CPU 2. The CCB is then available for a next output address input/output command.

In block 700, the input next status input/output command is received. The channel number addresses RAM 600 and in block 702, signal IONACK+ at binary 1 results in a not-acknowledge response to CPU 2 as shown in block 704. Signal IONACK+ at binary 0 results in an acknowledge response to CPU 2 as shown in block 706.

The difference pointer is decremented in block 708. Block 710 tests the result of the subtraction. A value of binary 00 indicates that the 4 CCB's will be empty when the input next status input/output command is completed. In block 712, I/O microprocessor 36 generates data byte $00_{16}$ over I/O data bus 74 to force the RAM 600 address location associated with the input next status input/output command channel number to binary 1 resulting in a not-acknowledge response to the next input next status input/output command. If the decremented difference pointer does not equal to binary 00, then in block 714 I/O microprocessor 36 generates data byte $01_{16}$ over I/O data bus 74 to force the RAM 600 address location associated with the input next status input/output command channel number to binary 0 resulting in an acknowledge response to the next input next status input/output command.

In block 716, the I/O microprocessor 36 generates data byte $81_{16}$ over I/O data bus 74 to force the RAM 600 address location associated with the output address input/outpout command channel number to binary 0 resulting in an acknowledge response to the next output address input/output command.

The status pointer is incremented to point to the CCB whose operation was completed. In block 720, the status of the CCB identified by the contents of the status pointer is transferred to CPU 2 over system bus 16.

The following logic circuits are described in the *TTL Data Book for Design Engineers*, Second Edition, Copyright 1976 by Texas Instruments Inc.

| Flops | 604, 622 | 74S74 |
|---|---|---|
|  | 608 | 74S279 |
|  | 610, 620 | 74S175 |
| Decoder | 612 | 74LS138 |
|  | 614 | 74S138 |
| MUX | 602 | 74S157 |

The following 5533 random access memory is described in the *Intersil Semiconductor Products Catalog* published by Intersil, Inc., 10900 N. Tantaw Avenue, Cupertino, Calif. 95014, printed March, 1976.

| RAM 600 | 5533 |
|---|---|

Microprocessors 36 and 56 are Motorola 6800B circuits described in *The Complete Microcomputer Data Catalog*, Copyright 1978, by Motorola Semiconductor Products Inc., Box 20912, Phoenix, Ariz.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A data processing system for transferring data bytes includes a system bus, a central processing unit (CPU) coupled to said system bus and generating a plurality of input/output command signals indicative of a first input/output command and a second input/output command and a plurality of channel number signals indicative of a plurality of communication channels, a main memory coupled to said system bus for storing said data bytes, and a communication multiplexer coupled to said system bus for receiving said plurality of input/output command signals and said plurality of channel number signals for controlling the transfer of said data bytes between each of said plurality of communication channels and said main memory, said communication multiplexer comprising:

first means coupled to said system bus and responsive to said plurality of input/output command signals and said plurality of channel number signals for generating a first not-acknowledge signal in a first state indicative of said communication multiplexer being unable to process said first or said second input/output command for one of said plurality of communication channels;

second means coupled to said first means and said system bus and having means responsive to said plurality of input/output command signals and said first not-acknowledge signal in said first state for generating a second not-acknowledge signal to said CPU indicative of a not-acknowledge response by said communication multiplexer of a request by said CPU for the processing of said first or said second input/output command for said one of said plurality of communication channels;

third means coupled to said system bus for storing signals representative of a plurality of communication control blocks (CCB's), block transfer information and difference pointer information; and fourth means coupled to said system bus, said first means and said third means and responsive to said plurality of input/output command signals and said difference pointer information signals for writing into said first means a binary bit in a first state indicative of said first not-acknowledge signal in a first state at a location defined by said plurality of channel number signals if said difference pointer information signals indicate that said communication multiplexer is unable to process said first or said second input/output command for said one of said plurality of communication channels and writes into said first means said binary bit in a second state indicative of said first not-acknowledge signal in a second state if said difference pointer information signals indicate that said communication multiplexer is able to process said first or said second input/output command for said one of said plurality of communication channels.

2. The system of claim 1 wherein said first means comprises:

multiplexer means coupled to said system bus and having a first plurality of input terminals for receiving a first plurality of channel number signals from said CPU during a read operation indicative of one of said plurality of communication channels and a first input/output command signal in a first state indicative of said first input/output command or said first input/output command signal in a second state indicative of said second input/output command; and first memory means coupled to said multiplexer means and having a first plurality of address locations for storing said binary bit for said first input/output command and for said second input/output command for said each of said plurality of communication channels and responsive to said first plurality of channel number signals and said first input/output command signal applied to a plurality of address terminals for reading one of said plurality of address locations storing said binary bit for generating said first not-acknowledge signal during said read operation, said binary bit in said first state for generating said first not-acknowledge signal in said first state and said binary bit in said second state for generating said first-acknowledge signal in said second state.

3. The system of claim 2 wherein said second means comprises:

first decoder means coupled to said system bus for receiving said plurality of input/output command signal indicative of said first input/output command and said second input/output command for generating a second input/output command signal; signal for generating a second input/output command signal indicative of said first or said second input/output command;

ANDing means coupled to said first memory means and said decoder means and responsive to said first not-acknowledge signal in said first state and said second input/output command signal for generating a second not-acknowledge signal;

not-acknowledge means coupled to said ANDing means and said system bus and responsive to said second not-acknowledge signal in a first state for generating said not-acknowledge response; and acknowledge means coupled to said ANDing means and said system bus and responsive to said second not-acknowledge signal in a second state for generating an acknowledge response to said CPU.

4. The system of claim 3 wherein said third means comprises:

second memory means for storing said plurality of CCB's for said each of said plurality of communication channels, each of said plurality of CCB's including address bytes indicating a location in said main memory of the next of said data bytes of a block of said data bytes being transferred between said one of said plurality of communication channels and said main memory, and status bytes indicating the status of the transfer of said block;

said second memory means being coupled to said system bus and being responsive to a plurality of signals from said CPU indicative of said first input/output command and a second plurality of channel number signals from said CPU for writing said address bytes received from said CPU in a selected one of said plurality of CCB's, and said second memory means being responsive to a plurality of signals indicative of said second input/output command and said second plurality of channel number signals from said CPU for reading said status byte from said selected one of said plurality of CCB's for transfer to said CPU and making said selected one of said plurality of CCB's available to a next of said first input/output commands.

5. The system of claim 4 wherein said second memory means further includes for each of said plurality of communication channels:

load pointer means for storing load pointer information for indicating the next of said plurality of CCB's to be responsive to said first input/output command; and difference pointer means for storing difference pointer information for indicating the number of said plurality of CCB's that are empty.

6. The system of claim 5 wherein said fourth means comprises:

microprocessor means coupled to said system bus and said third means and responsive to said first input/output command and said load pointer information for transferring said address bytes to said selected one of said plurality of CCB's of said second memory means, and having means for incrementing said difference pointer information and having first means for comparing said difference pointer information with a first predetermined number;

second decoder means coupled to said microprocessor means for generating a write signal when said comparing means indicates that all of said one of said plurality of CCB's are full, wherein said multiplexer means including selection means for generating a paging signal for selecting a second plurality of input terminals during a write operation for receiving from said microprocessor means a third plurality of channel number signals and a first data signal in a first state indicative of said first input/output command, and wherein said first memory means is coupled to said multiplexer means, said second decoder means, and said microprocessor means, said first memory means being responsive to said write signal, said third plurality of channel number signals and said first data signal in said first state applied to said plurality of address terminals for selecting a first location for writing said binary bit in said first state in response to a second data signal in a second state from said microprocessor means indicative of said not-acknowledge response when said comparing means indicates that all of said plurality of CCB's are full.

7. The system of claim 6 wherein said second decode means generates said write signal when said first comparing means indicates that at least one of said plurality of CCB's is full, thereby initiating said write operation;

said multiplexer means including said selection means for generating said paging signal for selecting said second plurality of input terminals for receiving from said microprocessor means a fourth plurality of channel signals and said first data signal in a second state indicative of said second input/output command;

said first memory means coupled to said second decoder means, said multiplexer means and said microprocessor means and responsive to said write signal, said fourth plurality of channel number signals and said first data signal in said second state applied to said plurality of address terminals for selecting a second location for writing said binary bit in a second state in response to said second data signal in a first state from said microprocessor means indicative of said acknowledge response.

8. The system of claim 7 wherein said microprocessor means is responsive to said second input/output command and having means for decrementing said difference pointer information and having second means for comparing said difference pointer information with a second predetermined number;

said second decoder means generaing said write signal when said comparing means indicates that all of said plurality of CCB's are empty;

said multiplexer means including said selection means for generating said paging signal for selecting said second plurality of input terminals during said write operation for receiving said fourth plurality of channel number signals and said first data signal in said second state indicative of said second input/output command;

said first memory means coupled to said multiplexer means, said second decoder means and said microprocessor means, said first memory means being responsive to said write signal, said fourth plurality of channel number signals, and said first data signal in said second state applied to said plurality of address terminals for selecting said second location for writing said binary bit in said first state in response to said second data signal in said second state indicative of said not-acknowledge response when said second comparing means indicates that all of said plurality of CCB's are empty.

9. The system of claim 8 wherein said second decoder means generates said write signal when said second comparing means indicates at least one of said plurality of CCB's is empty;

said multiplexer means including said selection means for generating said paging signal for selecting said second plurality of input terminals during said write operation for receiving said third plurality of channel number signals and said first data signal in said first state indicative of said first input/output command;

said first memory means coupled to said multiplexer means, said decoder means and said microprocessor means, said first memory means being responsive to said write signal and said third plurality of channel number signals and said first data signal in said first state applied to said plurality of address terminals for selecting said first location for writing said binary bit in said second state in response to said second data signal in said first state from said microprocessor means indicative of said acknowledge response when said comparing means indicates at least one of said plurality of CCB's is empty.

10. The system of claim 9 wherein said microprocessor means generates a sequence of said plurality of channel number signals representative of said each of said communication channels, and said first data signal in said first state and said sequence of said plurality of channel number signals and said first data signal in said second state in response to a third input/output command from said CPU for initializing said first memory means;

said second decoder means coupled to said microprocessor means for generating said write signal;

said multiplexer means including said selection means for generating said paging signal for selecting said second plurality of input terminals during said write operation for receiving said sequence of said plurality of channel number signals and said first data signal in said first state;

said first memory means coupled to said multiplexer means, said second decoder means and said microprocessor means, said first memory means being responsive to said write signal, each of said sequence of said plurality of channel number signals, said first data signal in said first state and said second data signal in said first state applied to said plurality of address terminals for writing said binary bit in said second state in each location addressed by said first input/output command;

said multiplexer means further receiving said sequence of said plurality of channel number signals and said first data signal in said second state;

said first memory means further responsive to said write signal, each of said sequence of said plurality of channel number signals, said first data signal in said second state and said second data signal in said second state applied to said plurality of address terminals for writing said binary bit in said first state in each location addressed by said second input/output command.

* * * * *